US012646639B2

(12) United States Patent
Walisko et al.

(10) Patent No.: US 12,646,639 B2
(45) Date of Patent: Jun. 2, 2026

(54) SEALING ARRANGEMENT FOR A DEVICE FOR DRIVING A COMPRESSOR AND DEVICE FOR DRIVING A COMPRESSOR AND METHOD FOR MOUNTING A SEALING ARRANGEMENT

(71) Applicant: Hanon Systems, Daejeon (KR)

(72) Inventors: David Walisko, Hürth (DE); Bernd Guntermann, Lennestadt (DE); Michael Haag, Cologne (DE)

(73) Assignee: HANON SYSTEMS, Daejeon (KR)

( * ) Notice: Subject to any disclaimer, the term of this patent is extended or adjusted under 35 U.S.C. 154(b) by 272 days.

(21) Appl. No.: 18/255,466

(22) PCT Filed: Feb. 21, 2022

(86) PCT No.: PCT/KR2022/002537
§ 371 (c)(1),
(2) Date: Jun. 1, 2023

(87) PCT Pub. No.: WO2022/186535
PCT Pub. Date: Sep. 9, 2022

(65) Prior Publication Data
US 2024/0013954 A1 Jan. 11, 2024

(51) Int. Cl.
*H01B 17/26* (2006.01)
*H01R 13/52* (2006.01)
*H01R 43/00* (2006.01)

(52) U.S. Cl.
CPC ........... *H01B 17/26* (2013.01); *H01R 13/521* (2013.01); *H01R 43/005* (2013.01)

(58) Field of Classification Search
CPC ...... H01B 17/26; H01R 13/521; H01R 13/52; H01R 2103/00; H01R 43/005; H01R 43/00
USPC .......................................................... 174/151
See application file for complete search history.

(56) References Cited

U.S. PATENT DOCUMENTS

| | | | | |
|---|---|---|---|---|
| 10,454,334 | B2 | 10/2019 | Heo et al. | |
| 2006/0134979 | A1 | 6/2006 | Henningsen | |
| 2009/0269955 | A1 | 10/2009 | Negishi et al. | |
| 2011/0076162 | A1* | 3/2011 | Heidecker .......... | H01R 13/5219 417/313 |

(Continued)

FOREIGN PATENT DOCUMENTS

| | | | |
|---|---|---|---|
| DE | 112015001426 | T5 | 12/2016 |
| JP | 5944169 | B2 | 7/2016 |

(Continued)

*Primary Examiner* — Timothy J Thompson
*Assistant Examiner* — Guillermo J Egoavil
(74) *Attorney, Agent, or Firm* — Shumaker, Loop & Kendrick, LLP; James D. Miller

(57) ABSTRACT

A sealing arrangement for guiding electrical connections through a wall of a housing for a device for driving a compressor. The sealing arrangement has a connection arrangement with at least one electrically conductive connection element and a holding element as well as at least one connection terminal element for receiving the at least one connection element in an axial direction. The connection terminal element is enclosed by the holding element and a sealing element, respectively. In doing so, the holding element for receiving the connection terminal element is formed from an electrically non-conductive material.

34 Claims, 3 Drawing Sheets

(56) References Cited

U.S. PATENT DOCUMENTS

| | | | |
|---|---|---|---|
| 2019/0052070 | A1 | 2/2019 | Hattori et al. |
| 2020/0395807 | A1 | 12/2020 | Heo et al. |

FOREIGN PATENT DOCUMENTS

| | | | | | |
|---|---|---|---|---|---|
| KR | 101319054 | B1 | | 10/2013 | |
| KR | 20180028304 | A | * | 3/2018 | ............. F04C 27/00 |
| KR | 1020180028304 | A | | 3/2018 | |
| KR | 20200087728 | A | | 7/2020 | |

* cited by examiner

PRIOR ART

Fig. 6A
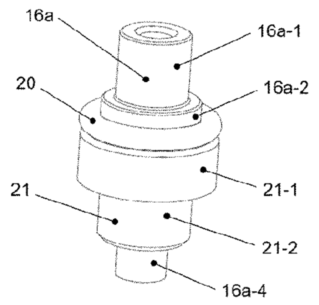
Fig. 6B
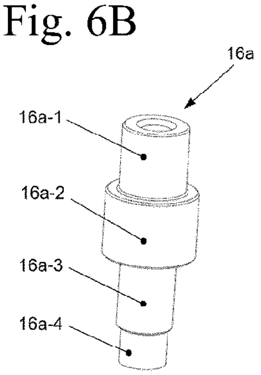
Fig. 6C
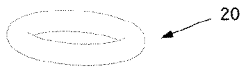
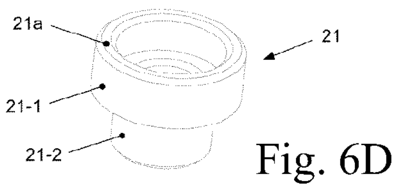
Fig. 6D

SEALING ARRANGEMENT FOR A DEVICE FOR DRIVING A COMPRESSOR AND DEVICE FOR DRIVING A COMPRESSOR AND METHOD FOR MOUNTING A SEALING ARRANGEMENT

CROSS REFERENCE TO RELATED PATENT APPLICATIONS

This is a U.S. national phase patent application of PCT/KR2022/002537 filed Feb. 21, 2022 which claims the benefit of and priority to German Patent Application No. 10 2022 103 229.9 filed on Feb. 11, 2022 and German Patent Application No. 10 2021 105 329.3 filed on Mar. 5, 2021, the entire contents of each of which are incorporated herein by reference.

TECHNICAL FIELD

The invention relates to a sealing arrangement for guiding electrical connections through a wall of a housing for a device for driving a compressor and a device for driving a compressor, in particular an electric motor, for compressing a vaporous fluid, specifically a refrigerant. The compressor can be used in the refrigerant circuit of an air-conditioning system of a motor vehicle.

Furthermore, the invention relates to methods for mounting a sealing arrangement.

BACKGROUND ART

Compressors for mobile applications which are known from the state of the art, in particular for air-conditioning systems of motor vehicles, for transporting refrigerant through a refrigerant circuit, also referred to as refrigerant compressors, are often formed as a piston compressor with variable capacity or as a scroll compressor, independent of the refrigerant. In doing so, the compressors are either driven via a pulley or electrically.

Apart from the electric motor for driving the respective compression mechanism, an electrically driven compressor has an inverter for driving the electric motor. The inverter serves to convert DC current of a vehicle battery into AC current which is supplied to the electric motor through electrical connections.

Traditional electric motors of the electrically driven compressors can be formed with a ring-shaped stator core with coils arranged thereon and a rotor, wherein the rotor is arranged within the stator core. The rotor and the stator are arranged on a common axis of symmetry or axis of rotation of the rotor.

The inverter has plug terminals for plug connectors formed as pins for the electric connection to terminals of the electric motor, which on the other hand are electrically connected to connection lines of conductive wires of the coils of the stator, also referred to as phase connectors. The terminals of the electric motor are formed in a plug housing which is, for example, arranged on an end face of the stator which is oriented in the axial direction of the stator.

During the assembly of the compressor, the plug connectors formed as pins are respectively plugged into a connection terminal provided in the plug housing and respectively contacted with an end piece connected to a corresponding conductive wire, in particular a connection line of the conductive wire. In doing so, the end piece is electrically and mechanically connected to the connection line of the conductive wire, such that only a respective small transition resistance between the plug connector of the inverter and the conductive wire is guaranteed.

The plug housing is to be electrically insulated and hermetically sealed against the plug connectors protruding from the motor housing and oriented towards the inverter arranged outside of the motor housing in order to guarantee that no fluid flowing in the compressor, specifically refrigerant and/or oil, gets into the environment and that no short circuits or damages occur in the inverter, in particular on electrical components arranged on a board of the inverter, which lead to failure of the compressor. In doing so, in particular the mechanical part of the compressor with the electric motor and the compression mechanism driven by the electric motor, charged with liquid refrigerant or oil, is to be sealed against the inverter as an electric part of the compressor.

In order to adhere to the required insulation resistances of the electric components and to reliably and completely insulate the current-carrying elements against fluids flowing in the motor housing and occurring contaminations, traditionally glass-metal vias of the plug connectors are used. The glass-metal vias have a metal base plate formed as a holding element for the plug connectors. The electrically conductive plug connectors are guided through the base plate, enclosed by glass and thus arranged insulated against the electrically conductive base plate.

The process of producing the glass-insulating via of the plug connectors through the base plate is complicated and expensive. For example, the glass is to be liquefied in order to arrange the glass around the plug connectors, which is a very delicate operation. The glass is prone to cracks, shrinkage cavities and other defects which are to be avoided at all costs.

The glass serving as an insulation material and holder of the respective plug connector has a specific shape due to predetermined dimensions and required electrical parameters, also in order to guarantee a correct and sufficient creepage distance to the base plate. The shape of glass protrusions, also referred to as vertical glass bondings, of the glass-metal vias is difficult to set and to reproduce and is subject to very large deviations in shape and amount conditional of manufacturing. When producing the glass-metal vias, the glass in the shape of sintered hollow cylinders is introduced into a melting tool together with the pin-shaped plug connectors as well as holding bodies. In doing so, the tolerances of all components to be connected add up. In order to reach the desired glass shape and guarantee reliability, a plurality of very time-consuming experiments with different glass amounts and production parameters is to be carried out. Furthermore, the proof of reliable adherence to the required limits is to be made with elaborate tests and proofs of capability. In order to cover or seal the glass surfaces, a respective sleeve with a properly matching surface is required. In doing so, the large deviations on the side of the sealings are to be balanced both with high flexibility and high accuracy.

Consequently, the requirements for the production of the glass-metal vias are very high, while the functioning of the complex component as a simple conductor element is less demanding, such that the production effort with the costs connected thereto and the functioning are in no reasonable relationship.

Furthermore, for an electrically driven compressor with an input voltage of at least 48 V, the diameter of the pin-shaped plug connectors is to be increased due to the higher flowing electric current compared to a compressor with an input voltage of 470 V. Pouring the larger pin-shaped plug connectors into the glass-metal vias makes the outlined production even more expensive.

DE 11 2015 001 426 T5 demonstrates an electrically driven compressor with a compression arrangement, an electric motor for driving the compression arrangement and an inverter for supplying the electric motor with current. The electric motor has a rotor and a stator with an electrically insulating coil body arranged at an end of a stator core, coils arranged on the coil body and a plug housing with connection terminals for electrically connecting the coils to the inverter. On the coil body, the plug housing is mechanically connected to the end face of the stator. Plug connectors are guided through a plate-shaped holding element in a hermetically sealing manner. A hermetic sealing is arranged between the holding element and a separating wall of the motor housing directed to the inverter.

The aim of the invention is to provide a sealing arrangement for a device for driving an electrically driven compressor of a vaporous fluid, in particular an electric motor, which can be produced in a simple manner and assembled in a time-efficient manner. The arrangement should be able to be realized in a structurally simple manner, also in order to minimize costs during production. In doing so, the complexity of the design of the sealing arrangement and thus of the device is to be minimized, wherein at the same time the sealing of the hermetic system against the environment and the electrical insulation in the inside of the compressor are optimized.

SUMMARY

The aim is achieved by the subject matters with the features as shown and described herein.

The aim is achieved by a sealing arrangement according to the invention for guiding electrical connections through a wall of a housing for a device for driving a compressor. The sealing arrangement has a connection arrangement with at least one electrically conductive connection element and a holding element.

According to the design of the invention, the sealing arrangement is formed with at least one connection terminal element for receiving the connection element in the direction of a longitudinal axis. The connection terminal element is enclosed by the holding element and at least one sealing element, respectively, in the radial direction. In doing so, the holding element for receiving the connection terminal element is formed from an electrically non-conductive, in particular of a synthetic material, which serves as an electrical insulator for the electrically conductive connection terminal element with the connection element and at the same time offers sufficient stability over the entire service life. With an arrangement of several connection terminal elements, respectively for receiving a connection element, the formation of the holding element from an electrically non-conductive material respectively guarantees an insulating environment around an electrically conductive connection terminal element.

The at least one sealing element is arranged in the region of a through opening of the housing between the housing, in particular the wall of the housing, and the connection terminal element and respectively sealing in the radial direction, on the housing in a fluid-tight manner and bearing against the connection terminal element.

According to a further development of the invention, the sealing arrangement has the at least one sealing element and a support element. In doing so, the sealing element is formed in a ring-shaped manner, in particular in a circular ring-shaped manner, specifically as an O-ring seal.

The sealing element can be formed from an elastomer in order to guarantee a respective sealing connection on the sealing surfaces.

The support element is substantially formed as a hollow cylinder with an end face facing the holding element in the axial direction and an end face protruding into the housing in the axial direction. In doing so, the support element has sections arranged along the longitudinal axis, preferably with different inner diameters. The support element can in particular be formed with at least two sections with different inner diameters and a stepped transition on the inside. The support element is preferably formed from an insulating material, in particular a plastic material.

According to an advantageous embodiment of the invention, the support element has a sealing surface on the end face facing the holding element in the axial direction.

Alternatively, the at least one sealing element and the support element can be formed as an integral component. In doing so, the sealing element and the support element are connected to one another preferably on the end face of the support element facing the holding element in the axial direction.

According to a further development of the invention, the at least one connection terminal element is arranged in a through opening in the holding element preferably having the shape of a plate with opposing surfaces. The through opening serves to receive the connection terminal element. In doing so, the holding element advantageously bears against an outer surface of the housing, while the connection terminal element protrudes through the through opening of the housing into a volume enclosed by the housing.

The connection terminal element is preferably arranged flush with an end face to a surface of a side of the holding element facing away from the housing.

According to a preferred embodiment of the invention, the holding element respectively has, at a side facing the housing, a sealing surface running completely around the through opening for placing the sealing element. In doing so, the sealing surface of the holding element and the sealing surface of the support element are preferably arranged facing one another and respectively corresponding to the sealing element, such that the sealing element is arranged between the sealing surfaces in the axial direction.

In the alternative design of the sealing element and the support element as an integral component, the sealing element and the support element are connected to one another in the region of the sealing surface of the support element.

A further advantage of the invention is that the sealing surface of the holding element is formed on a free end face of a protrusion which protrudes from the surface of the side of the holding element oriented facing the housing in the axial direction, in particular uniformly, in particular with a constant extension. The protrusion is preferably formed as a ring which fully encloses the through opening of the holding element.

Apart from a further preferred embodiment of the invention, the connection terminal element is substantially formed as a circular cylinder with sections with different outer diameters arranged along the longitudinal axis.

The connection terminal element is preferably formed with an opening shaped as a circular cylinder extending starting from an end face facing in the direction of the outside of the housing and in the longitudinal direction of the connection terminal element, in particular a blind hole, for receiving the connection element.

The connection terminal element is preferably arranged with a first section within the through opening formed in the holding element. In doing so, the first section of the connection terminal element in particular has an outer diameter which substantially corresponds to an inner diameter of the through opening plus a clearance.

The connection terminal element in particular has a second section joining the first section in the direction of the longitudinal axis and which is formed with a larger outer diameter than the first section. The second section of the connection terminal element can be enclosed by the sealing element at least in regions. In doing so, the second section of the connection terminal element advantageously has an outer diameter which corresponds to an inner diameter of the sealing element plus a clearance.

The connection terminal element is further preferably formed with a third section joining the second section in the direction of the longitudinal axis and which has a smaller outer diameter than the second section, such that a stepped transition is provided between the second section and the third section.

A further advantage of the invention is that the third section and a region of the second section of the connection terminal element joining the third section are fully enclosed by the support element.

According to a preferred embodiment of the invention, the support element is firmly connected to the connection terminal element at least in the region of the third section of the connection terminal element. In doing so, the third section of the connection terminal element has an outer diameter which substantially corresponds to an inner diameter of the support element plus a clearance.

The support element is preferably arranged with a first section in the region of the second section of the connection terminal element and with a second section in the region of the third section of the connection terminal element.

The connection terminal element can further have a fourth section joining the third section in the direction of the longitudinal axis and which is formed with a smaller outer diameter than the third section, such that a stepped transition is provided between the third section and the fourth section as well. The fourth section of the connection terminal element is preferably fully enclosed by a conductive wire of a coil of a stator of an electric motor, such that the connection terminal element and the conductive wire are in electrical contact.

According to a further development of the invention, the support element with the second section between the connection terminal element and a wall of a carrier element, in particular a stator, is arranged such that it seals the connection terminal element against the carrier element. In doing so, the support element and the carrier element can be formed such that they are connected to one another in a firm and fluid-tight manner, in particular as an integral component, specifically as a one-piece cast element.

In a possible embodiment of the invention, in which the connection terminal element of the connection element and the support element are firmly connected to one another via an interference fit, and the support element is cast as an integral component with the carrier element of the stator, the connection terminal element with the support element is integrated into the stator.

According to a further preferred embodiment of the invention, the connection element is formed in a cylinder-shape as a pin-shaped plug connector and preferably has the shape of a straight pin. The connection element is in particular shaped as a circular cylinder with a constant outer diameter, specifically with an external thread.

A first end of the connection element is advantageously inserted, in particular screwed into the opening formed as a blind hole in the end face of the connection terminal element facing the outside of the housing.

The connection element with the connection terminal element preferably serves to connect electrical terminals arranged within the housing, in particular of the conductive wire of the coil of the stator of the electric motor, to electrical terminals arranged outside the housing, in particular an inverter. In doing so, an end face of the connection terminal element can be electrically connected to a conductive track formed on a circuit board of the inverter.

The aim is further achieved by a first method according to the invention for mounting a sealing arrangement for guiding electrical connections through a wall of a housing. The method has the following steps:

- connecting at least one connection terminal element with at least one sealing element and a support element which fully and sealingly enclose the connection terminal element at least in regions,
- connecting the connection terminal element with the sealing element and the support element which enclose the connection terminal element to a holding element by introducing the connection terminal element into a through opening formed in the holding element in the direction of a longitudinal axis, wherein the sealing element bears against the holding element,
- introducing the connection terminal element in the direction of the longitudinal axis into a through opening formed in a first wall of the housing, wherein the sealing element is arranged between the housing and the connection terminal element,
- connecting a conductive wire as a connection line of a coil in the region of an end face of the connection terminal element to the connection terminal element, and
- attaching the holding element to the housing, wherein the holding element is pressed against the sealing element arranged on the holding element in the direction of the longitudinal axis such that the sealing element is elastically deformed and seals in the radial direction.

According to a further development of the invention, the connection terminal element with the support element is inserted into a carrier element in the through opening formed in the wall of the housing, in particular of the stator, in the direction of the longitudinal axis during the operation of insertion, such that the support element is arranged between the connection terminal element and a wall of the carrier element, sealing the connection terminal element to the carrier element.

Apart from providing the sealing surface for the sealing element and compressing the sealing element in the axial direction, the support element in particular serves to center the connection terminal element.

The aim is furthermore achieved by a second method according to the invention for mounting a sealing arrangement for guiding electrical connections through a wall of a housing. The method has the following steps:

- connecting at least one connection terminal element with at least one sealing element and a support element which fully and sealingly enclose the connection terminal element at least in regions and are formed as a component of a carrier element of a stator,
- connecting a conductive wire as a connection line of a coil in the region of an end face of the connection terminal element to the connection terminal element by putting the carrier element on the stator, introducing the connection terminal element in the direction of a longitudinal axis into a through opening formed in a wall of the housing, wherein the sealing element is arranged between the housing and the connection terminal element, connecting a holding element to the connection terminal element by introducing the connection terminal element into a through opening formed in the holding element in the direction of the longitudinal axis, wherein the sealing element bears against the holding element, and attaching the holding element to the housing, wherein the holding element is pressed against the sealing element arranged on the holding element in the direction of the longitudinal axis such that the sealing element is elastically deformed and seals in the radial direction.

According to an advantageous embodiment of the invention, one respective connection element is introduced, in particular screwed into an opening formed in the connection terminal element in the longitudinal direction, such that the connection element and the connection terminal element are aligned coaxially to one another and electrically connected to one another.

In the possible embodiment of the invention, in which the connection terminal element of the connection element and the support element are firmly connected to one another via an interference fit, and the support element on the other hand is formed as an integral component with the sealing element and the carrier element of the stator, in particular cast, the arrangement of the connection terminal element and the sealing element with the support element and the carrier element is advantageously mounted on the stator. Subsequently, the stator is brought into the housing, wherein the connection terminal element is introduced through a through opening provided in the wall of the housing from the inside. In the next step, each connection terminal element is connected to the holding element by respectively introducing the connection terminal element into a through opening formed in the holding element. In doing so, the holding element is placed on the housing and subsequently screwed with the housing. The sealing element is sealingly deformed bearing between the housing and the connection terminal element. In this embodiment of the invention, the connection element which is advantageously screwed into the opening formed as a blind hole in the end face of the connection terminal element facing the outside of the housing can tighten the stator to the holding element in the axial direction and thus create the required contact pressure for deforming the sealing element.

The aim is also achieved by a device according to the invention for driving a compressor of a vaporous fluid, in particular the electric motor. The device has a rotor and the stationary stator, which extend along a common longitudinal axis, and the housing. The stator is advantageously positioned in the radial direction at an outside of the rotor, enclosing the rotor.

According to the design of the invention, the sealing arrangement of the invention is formed at a first end face of the stator oriented in an axial direction.

Here, the axial direction is the direction of the longitudinal axis of the stator, which also corresponds to the longitudinal axis and the axis of rotation of the rotor. An end face oriented in the axial direction is arranged in a plane oriented perpendicular to the longitudinal axis.

The advantageous design of the invention enables the use of the device for driving a compressor, in particular of an electric motor, for compressing a vaporous fluid for a compressor of a refrigerant in a refrigerant circuit of an air-conditioning system of a motor vehicle.

In the sealing arrangement according to the invention, the holding element is advantageously formed in the shape of a conductor insulation plate with a sealing function which does not, as known from the state of the art, carry the connection element formed as a plug connector, but the connection terminal element.

The sealing arrangement according to the invention or the device according to the invention for driving a compressor of a vaporous fluid with the sealing arrangement in summary have further diverse advantages:

simple and time-saving assembly of components with low complexity, but reduction of the assembly steps and minimum production and assembly costs, and maximum functional safety through radial sealing.

BRIEF DESCRIPTION OF DRAWINGS

Further details, features and advantages of designs of the invention result from the following description of example embodiments with reference to the accompanying drawings. It is shown:

FIGS. 6A to 6D: a connection terminal element and sealing elements and support elements of the sealing arrangement of FIG. 3 in an assembled state and as individual elements in a respective perspective view.

DESCRIPTION OF AN EMBODIMENT

Figure 1A:
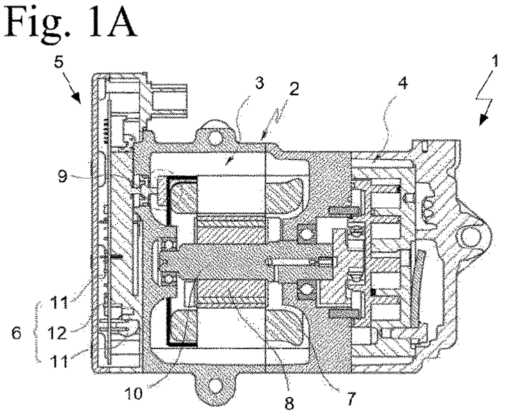
FIG. 1A: an electrically driven compressor with a device, in particular an electric motor, for driving a compression mechanism and an arrangement of an inverter in a sectional view.

FIG. 1A demonstrates an electrically driven compressor 1 of a vaporous fluid, specifically for an air-conditioning system of a motor vehicle, for transporting refrigerant through a refrigerant circuit, with an electric motor 3 arranged in a housing 2 as a device 3 for driving a compression mechanism 4 and a device of an inverter 5 in a sectional view. The electric motor 3 is supplied with electric energy via a switching device 6 of the inverter 5.

The electric motor 3 has a stator 7 with a substantially hollow cylinder-shaped stator core and coils wound on the stator core as well as a rotor 8 arranged within the stator 7. The rotor 8 is set into a rotational movement if the coils of the stator 7 are supplied with electrical energy via a connection arrangement 9. The connection arrangement 9 is formed on an end face of the stator 7 and has a plurality of electrical terminals.

The rotor 8 is coaxial within the stator 7 and arranged such that it can be rotated around an axis of rotation. A drive shaft 10 can be formed integral with the rotor 8 or as a separate element.

The electric motor 3 and the compression mechanism 4 which is, as an example, formed as a scroll compressor with a fixed and an orbiting spiral, are arranged within a volume enclosed by the housing 2. In doing so, the housing 2 is formed from a first housing element for receiving the electric motor 3 and a second housing element for receiving the compression mechanism 4 and preferably from a metal, in particular from an aluminum.

The orbiting spiral of the compression mechanism 4, in which the vaporous fluid, specifically a refrigerant, is compressed, is driven via the drive shaft 10 connected to the rotor 8 of the electric motor 3. According to a non-represented embodiment, the compression mechanism can also be formed with a swash plate, for example.

The switching device 6 for controlling the operation of the electric motor 3 has a circuit board 12 formed with different switching elements 11. On the conductor plate 12, different control circuits and components are mounted in an electrically connected manner and are supplied with electrical energy from an external power source.

Figure 1B:
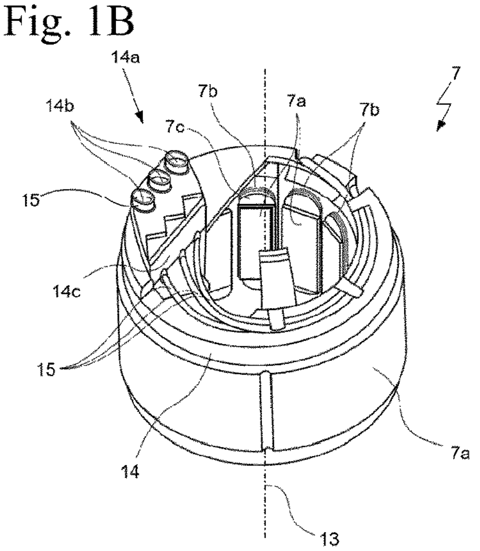
FIG. 1B: a stator of the electric motor with a stator core, coils, an insulation and a carrier element in a perspective view.

In FIG. 1B, a stator 7 of the electric motor 3 is shown in a perspective view. The stator 7 is formed with a stator core 7*a*, coils 7*b*, an insulation 7*c* and a carrier element 14 with a receiving element 14*a* for a plug housing 14*c*.

The electric motor 3, for example an alternating current motor with three phases, has the non-represented rotor and the stator core 7*a* arranged in the radial direction on an outside of the rotor and thus around the rotor. The stator core 7*a* which is preferably formed as a core stack and the insulation 7*c* formed from an electrically insulating material respectively extend along a longitudinal axis 13 which also corresponds to the longitudinal axis of the stator 7 and the axis of rotation of the rotor from a first end face to a second end face of the stator 7.

The coils 7*b* are respectively formed as an electrical conductor, also referred to as a conductive wire 15, from a wire wound around a region of the stator core 7*a* extending to the inside in the radial direction. The non-wound ends of the conductive wires 15 are guided out of the respective winding as connection lines.

The stator core 7*a*, the insulation 7*c* and the coils 7*b* form the stator unit of the electric motor 3.

On a first end side of the stator 7, the carrier element 14 with the receiving element 14*a* with connection passages 14*b* for the plug housing 14*c* with connection terminals is arranged. The connection terminals of the plug housing 14*c* respectively serve as a component of an electrical connection between the coils 7*b* of the electric motor 3 and the non-represented inverter 5, in particular electrically conductive, pin-shaped connection elements, which are arranged guided through the connection passages 14*b* of the receiving element 14*a* of the carrier element 14 and plugged into the connection terminals of the plug housing 14*c*.

The connection lines of the conductive wires 15 of the coils 7*b* and the connection terminals of the plug housing 14*c* arranged in the receiving element 14*a* are connected to one another in an electrically conductive manner.

The carrier element 14 with the receiving element 14*a* and the plug housing 14*c* arranged in the receiving element 14*a* bears against the stator 7 in the axial direction, in particular against the stator core 7*a*, in the assembled state of the stator 7. In doing so, the receiving element 14*a* for the plug housing 14*c* is formed as a part of the carrier element 14. The carrier element 14 with the receiving element 14*a* with the connection passages 14*b* for the plug housing 14*c* with the connection terminals is formed as one unit, in particular as a one-piece injection molded element. The integral design is realized within a shaping process.

In order to introduce the connection elements as electrical connectors to the inverter 5, which is not represented, through the enclosure of the receiving element 14*a* into the plug housing 14*c*, the connection passages 14*b* are provided within the enclosure of the receiving element 14*a*. The connection passages 14*b* are oriented in the axial direction.

Figure 2A:
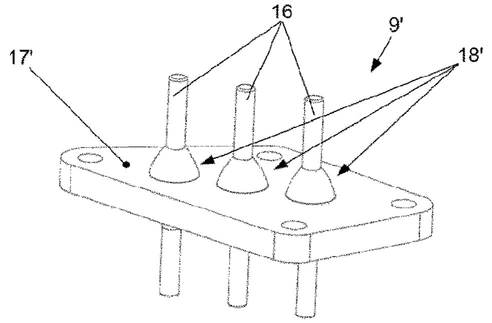
FIG. 2A: a connection arrangement of a sealing arrangement for connection elements with a holding element and shape elements for the electrical connection of terminals arranged in the plug housing to terminals of the inverter from the state of the art in a perspective view.
Figure 2B:
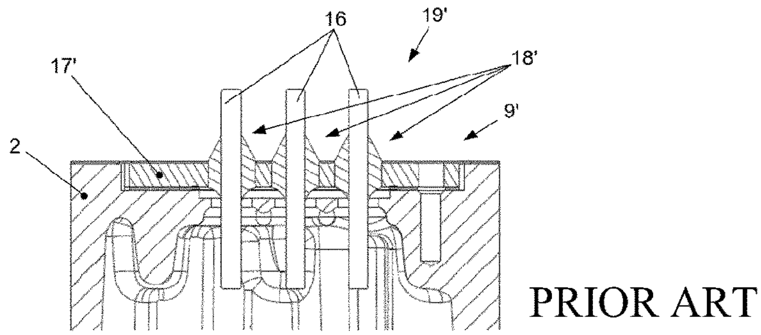
PRIOR ART Fig. 2B
FIG. 2B: a section of a sealing arrangement with the connection arrangement of FIG. 2A of the state of the art in a sectional view.

In FIG. 2A, a connection arrangement 9', in particular an electric glass-metal via, of a sealing arrangement for connection elements 16 with a holding element 17' and shape elements 18' for electrically connection terminals arranged in the non-represented plug housing 14*c* to terminals of the inverter 5, which is not represented either, from the state of the art is represented in a perspective view. FIG. 2B demonstrates a section of a sealing arrangement 19' with the connection arrangement 9' of FIG. 2A with a sealing element for sealing the holding element 17' against the housing 2 of the state of the art in a sectional representation.

The connection elements 16 are arranged guided through the plate-shaped holding element 17'. Every connection element 16 having the shape of a straight pin, hereinafter also referred to as a plug connector 16, is arranged forming three different regions which are aligned along a common axis, in particular a longitudinal axis. In doing so, a first region and a second region respectively protrude from the opposing surfaces of the plate-shaped holding element 17'. A third region of the plug connector 16 is respectively arranged within the holding element 17'.

The plug connectors 16 which are preferably formed as straight circular cylinders with a constant diameter along their length are respectively arranged in the third region within a through opening provided in the holding element 17'. In doing so, the inner diameter of the through opening corresponds to the outer diameter of the plug connector 16 plus a clearance for mounting and fixing the plug connector 16 within the through opening. The gap formed between the plug connector 16 and the wall of the holding element 17' running around the through opening is filled by the shape element 18', in particular a glass shape element or a glass body. The shape element 18' filling the gap, preferably formed from a glass, serves, on the one hand, to fix the plug connector 16 within the through opening and thus on the holding element 17' and, on the other hand, to insulate the electrically conductive plug connector 16 from the holding element 17'. In doing so, the shape element 18' protrudes from the plane of the respective surface of the holding element 17' in the direction of the plug connector 16. The protrusions of the shape element 18' respectively substantially have the shape of a cone or a truncated cone.

Figure 3:
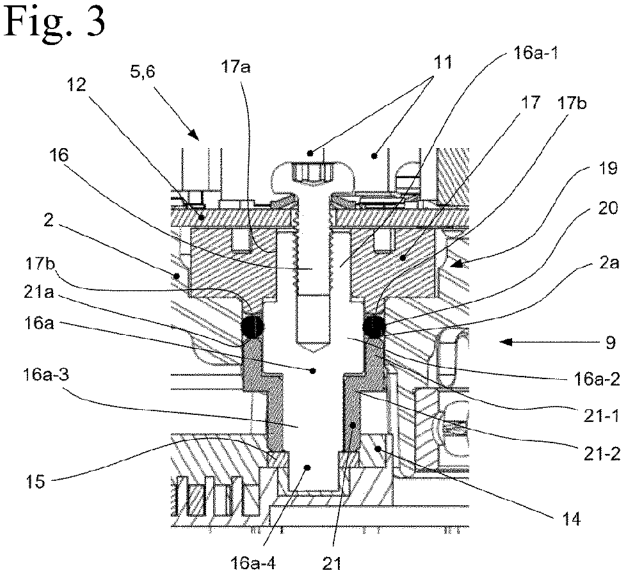
FIG. 3: a sealing arrangement according to the invention for guiding electric connections through a housing of a device for driving a compressor in a sectional view.
Figure 4:
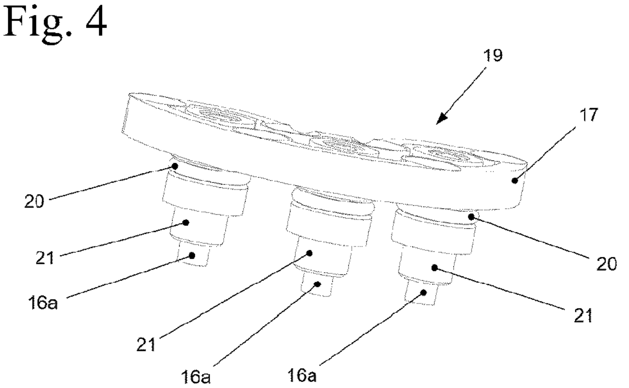
FIG. 4: the sealing arrangement of FIG. 3 with a holding element, sealing elements, support elements and connection terminal elements as assembled individual components in a perspective view.

FIG. 3 shows a sealing arrangement 19 according to the invention for guiding plug connectors 16 as electrical connection elements through the housing 2 of a compressor, specifically as a connection to the electric motor as a device for driving the compressor, in a sectional view. In FIG. 4, the sealing arrangement 19 from FIG. 3 with a holding element

Figure 5A:
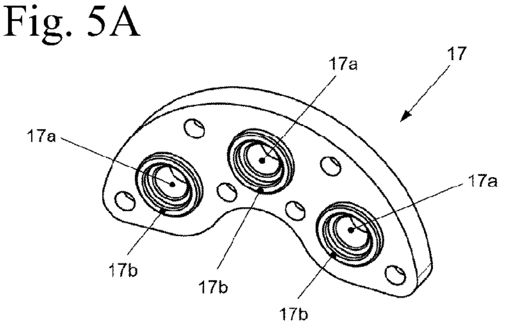
FIGS. 5A and 5B: the holding element of the sealing arrangement of FIG. 3 as an individual element in a respective perspective view.
Figure 5B:
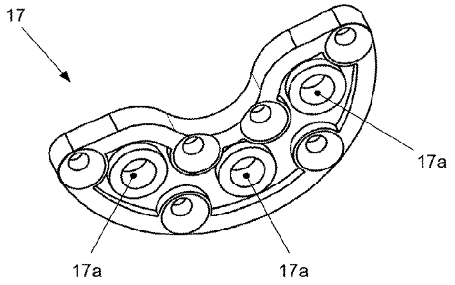

17, sealing elements 20, support elements 21 and connection terminal elements 16*a* as mounted individual components is shown in a perspective view, while in FIGS. 5A and 5B, the holding element 17 of the sealing arrangement 19 from FIG. 3 is represented as an individual element and in FIGS. 6A to 6D, a connection terminal element 16*a* and the sealing elements 20 as well as the support elements 21 of the sealing arrangement 19 from FIG. 3 are represented in the assembled state as well as individual elements, in a respective perspective view.

Within the housing 2 having an end face with a through opening 2*a* for guiding the plug connector 16 through, the stator of the electric motor is arranged with the carrier element 14.

An end of a respective conductive wire 15 wound into a coil is guided along the carrier element 14 as a connection line to the connection terminal element 16*a*. The connection terminal element 16*a* serves as a component of the electrical connection between the coil of the electric motor and the inverter 5, in particular the electrically conductive, pin-shaped plug connector 16, a first end of which is guided through the through opening 2*a* formed in the end face of the housing 2 or guided into the through opening 2*a* and inserted, in particular screwed into the connection terminal element 16*a*.

The switching device 6 of the inverter 5 is fixed with the conductor plate 12 and the switching elements 11 provided on the conductor plate 12 on the surface of the end face of the housing 2 facing the environment of the housing 2. In doing so, the circuit board 12 can bear against the housing 2.

The plug connector 16, which is in particular formed as a screw of a screw connection, is contacted with a conductor track of the conductor plate 12, such that an electrically conductive connection to the conductive wire 15 of the coil of the stator is created between the switching device 6 of the inverter 5 via the plug connector 16 and the connection terminal element 16*a*.

Alternatively, the connection terminal element 16*a* can be electrically connected to a conductive track formed on the circuit board 12 at the end face directed to the circuit board 12.

The connection terminal element 16*a* is fixed within a through opening 17*a* formed in the holding element 17. In doing so, the substantially cylinder-shaped connection terminal element 16*a* has regions with different outer diameters along the longitudinal axis, also according to FIG. 6B. A first section 16*a*-1 is formed with an outer diameter which corresponds to an inner diameter of the through opening 17*a* formed in the holding element 17 plus a clearance for assembly. The holding element 17 formed from an electrically non-conductive material such as polyphthalamide or polyamide further serves as an electrical insulation of the connection terminal element 16*a* against the housing 2.

A second section 16*a*-2 joining the first section 16*a*-1 in the axial direction and thus in the direction of the longitudinal axis of the connection terminal element 16*a* has a larger outer diameter than the first section 16*a*-1.

The second section 16*a*-2 is fully enclosed by a ring-shaped sealing element 20 in regions. In doing so, the second section 16*a*-2 is formed with an outer diameter which corresponds to an inner diameter of the sealing element 20 plus a clearance for sliding the sealing element 20 onto the connection terminal element 16*a*. According to FIGS. 6A and 6C as well, the sealing element 20 is preferably formed as an O-ring sealing.

A third section 16*a*-3 joining, on the other hand the second section 16*a*-2 in the direction of the longitudinal axis of the connection terminal element 16*a* has a smaller outer diameter than the second section 16*a*-2 such that a stepped transition is formed between the second section 16*a*-2 and the third section 16*a*-3.

The third section 16*a*-3 of the connection terminal element 16*a* and a region of the second section 16*a*-2 of the connection terminal element 16*a* joining the third section 16*a*-3 are fully enclosed by a substantially hollow cylinder-shaped or tube-shaped support element 21, also according to FIG. 6A. The third section 16*a*-3 of the connection terminal element 16*a* is formed with an outer diameter which corresponds to an inner diameter of the support element 21 plus a clearance. In doing so, the support element 21 with the corresponding inner diameter in the region of the third section 16*a*-3 of the connection terminal element 16*a* can alternatively also be pressed onto the connection terminal element 16*a* and thus be fixed on the connection terminal element 16*a* sealed against the connection terminal element 16*a*.

The support element 21 as well is formed with two sections 21-1, 21-2 with at least different inner diameters and thus with a stepped transition on the inside, which is also specifically shown in FIG. 6D. In the assembled state of the sealing arrangement 19, a first section 21-1 of the support element 21 is arranged in the region of the second section 16*a*-2 of the connection terminal element 16*a*, while a second section 21-2 of the support element 21 is arranged in the region of the third section 16*a*-3 of the connection terminal element 16*a*. The second section 21-2 of the support element 21 is sealingly connected to the connection terminal element 16*a* in the region of the third section 16*a*-3 of the connection terminal element 16*a*.

In the region of the second section 16*a*-2 of the connection terminal element 16*a*, the connection terminal element 16*a* is enclosed by the housing 2 such that the sealing element 20 respectively bears against an outer jacket surface of the second section 16*a*-2 of the connection terminal element 16*a* on the one hand and an inner surface of the through opening 2*a* on the housing 2 on the other hand in a sealing manner.

A fourth section 16*a*-4 joining, on the other hand the third section 16*a*-3 in the direction of the longitudinal axis of the connection terminal element 16*a* has a smaller outer diameter than the third section 16*a*-3 such that a stepped transition is formed between the third section 16*a*-3 and the fourth section 16*a*-4 of the connection terminal element 16*a*. The fourth section 16*a*-4 of the connection terminal element 16*a* is fully enclosed by the conductive wire 15 of the coil of the stator, in particular according to FIG. 3. In doing so, the conductive wire 15 fully bears against the jacket surface of the fourth section 16*a*-4 of the connection terminal element 16*a* and can additionally bear against the end face of the stepped transition formed between the third section 16*a*-3 and the fourth section 16*a*-4. Thus, an electric contact between the conductive wire 15 and the connection terminal element 16*a* is established.

The connection terminal element 16*a*, which is substantially in the shape of a circular cylinder, is formed as a round bar with an opening shaped as a circular cylinder extending starting from a first end face facing in the direction of the conductor plate 12 and in the longitudinal direction of the connection terminal element 16*a*, in particular a blind hole, for receiving the plug connector 16. During the assembly of the connection arrangement 9, the plug connector 16 is introduced into the opening in the longitudinal direction such that the plug connector 16 and the connection terminal element 16*a* are aligned coaxially to one another. In doing so, the plug connector 16 is formed with an outer diameter which corresponds to an inner diameter of the opening formed in the connection terminal element 16*a*. The plug connector 16 is preferably screwed into the opening provided in the connection terminal element 16*a* in order to guarantee a secure electrical contact between the plug connector 16 and the connection terminal element 16*a*.

The first end face of the connection terminal element 16*a* is arranged flush with a surface of the plate-shaped holding element 17 facing away from the housing 2.

The sealing element 20 and the first section 21-1 of the support element 21 are arranged within a gap-shaped intermediate space formed between the through opening 2*a* of the housing 2 and the connection terminal element 16*a*, sealing the gap. Furthermore, a second section 21-2 of the support element 21 is arranged between the connection terminal element 16*a* and a wall of the carrier element 14 of the stator, sealing the connection terminal element 16*a* against the carrier element 14. The sealing element 20 is preferably formed from an elastomer, while the support element 21 is formed from an insulating material, in particular a plastic material.

According to an alternative embodiment, the sealing element 20 and the support element 21 are formed as an integral component.

Furthermore, the support element 21 can be firmly and fluid-tightly be connected to the carrier element 14 of the stator in the region of the second section 21-2. In doing so, the support element 21 and the carrier element 14 are advantageously formed as an integral component, in particular as a single-piece cast element.

The holding element 17, on the side facing the inside of the housing 2 and thus the sealing element 20, respectively has a sealing surface 17*b* fully running around the through opening 17*a* for sealingly bearing the sealing element 20. The sealing surface 17*b* is formed as a free end face of a protrusion which uniformly protrudes from the surface of the holding element 17 in the axial direction and is formed as a ring enclosing the second section 16*a*-2 of the connection terminal element 16*a*. Every ring-shaped sealing element 20 fully bears against a sealing surface 17*b* of the holding element 17 in the axial direction.

The support element 21 is formed with a sealing surface 21*a* with a free end face of the first section 21-1 facing the sealing element 20 or the sealing surface 17*b* of the holding element 17 in the axial direction. The sealing surface 17*b* of the holding element 17 and the sealing surface 21*a* of the support element 21 are aligned facing one another and respectively formed corresponding to the sealing element 20. The sealing element 20 is arranged between the sealing surfaces 17*b*, 21*a* in the axial direction. In doing so, the support element 21, in the region of the second section 21-2, has a smaller dimension in the axial direction or a smaller length than the connection terminal element 16*a* in the region of the third section 16*a*-3. The third section 16*a*-3 of the connection terminal element 16*a* is formed with an extension in the axial direction, which corresponds to the sum of the extensions of the second section 21-2 of the support element 21 in the region of an inner jacket surface and the protrusion of the holding element 17 minus a gap for receiving the sealing element 20 which is elastically deformed for sealing.

In the alternative embodiment of the sealing element 20 and the support element 21 as an integral component, the sealing element 20 and the support element 21 are connected to one another in particular in the region of the original sealing surface 21*a* of the support element 21.

In the assembled state, the support element 21, with a free end face of the second section 21-2, which is distally opposite the first end face with the sealing surface 21*a*, and the connection terminal element 16*a* with the end face formed between the third section 16*a*-3 and the fourth section 16*a*-4 at the stepped transition bear against the conductive wire 15 which on the other hand is pressed against the stator. The second end face of the connection terminal element 16*a* which is formed distally to the first end face protrudes through the conductive wire 15 into the carrier element 14.

In case of pressure acting in the axial direction, in particular through moving the holding element 17 in the axial direction during the fixation on the housing 2, by means of screw connections, for example, the ring-shaped sealing element 20 is pressed against the sealing surface 17*b* of the holding element 17 and the sealing surface 21*a* of the support element 21 and pressed apart in the radial direction and consequently pressed against the housing on the one hand and against the connection terminal element 16*a* on the other hand.

In reaction to the pressure forces, the sealing element 20 is urged to the outside and to the inside in the radial direction in order to build up a radial pressure and press the sealing element 20 against the housing 2 and the connection terminal element 16*a* such that the radial sealing is guaranteed. Thus, the interior of the housing 2 is sealed against the environment.

LIST OF REFERENCE NUMERALS

- 1 Compressor
- 2 Housing
- 2*a* Through opening of housing 2
- 3 Device, electric motor
- 4 Compression mechanism
- 5 Inverter
- 6 Switching device
- 7 Stator
- 7*a* Stator core
- 7*b* Coil
- 7*c* Insulation
- 8 Rotor
- 9, 9' Connection arrangement
- 10 Drive shaft
- 11 Switching element
- 12 Circuit board
- 13 Longitudinal axis
- 14 Carrier element
- 14*a* Receiving element
- 14*b* Connection passage
- 14*c* Plug housing
- 15 Conductor wire
- 16 Connection element, plug connector
- 16*a* Connection terminal element
- 16*a*-1 First section of connection terminal element 16*a*
- 16*a*-2 Second section of connection terminal element 16*a*
- 16*a*-3 Third section of connection terminal element 16*a*
- 16*a*-4 Fourth section of connection terminal element 16*a*
- 17, 17' Holding element
- 17*a* Through opening of holding element 17
- 17*b* Sealing surface of holding element 17
- 18' Shape element
- 19, 19' Sealing arrangement
- 20 Sealing element

21 Support element

21-1 First section of support element 21

21-2 Second section of support element 21

**21*a* Sealing surface of support element 21**

The invention claimed is:

1. A sealing arrangement for guiding electrical connections through a wall of a housing for a device for driving a compressor, comprising a connection arrangement with at least one electrically conductive connection element and a holding element, wherein at least one connection terminal element for receiving the at least one connection element is formed in an axial direction, which is respectively enclosed by the holding element and at least one sealing element, wherein the holding element for receiving the at least one connection terminal element is formed from an electrically non-conductive material, and the at least one sealing element is arranged in a region of a through opening of the housing between the housing and the at least one connection terminal element and respectively arranged sealing in a radial direction, in a fluid-tight manner on the housing and bearing against the at least one connection terminal element, wherein a support element is formed, wherein the at least one sealing element is formed in a ring-shaped manner.

2. The sealing arrangement according to claim 1, wherein the support element is substantially hollow cylinder-shaped with an end face facing the holding element in the axial direction and an end face protruding into the housing in the axial direction.

3. The sealing arrangement according to claim 2, wherein the support element is formed with sections arranged along a longitudinal axis with different inner diameters.

4. The sealing arrangement according to claim 3, wherein the support element is formed with at least two of the sections with different inner diameters and a transition formed on an inside in a stepped manner.

5. The sealing arrangement according to claim 2, wherein the support element is formed with a sealing surface with an end face facing the holding element in the axial direction.

6. The sealing arrangement according to claim 2, wherein the at least one sealing element and the support element are formed as one integral component.

7. The sealing arrangement according to claim 6, wherein the at least one sealing element and the support element are formed connected to one another on the end face of the support element facing the holding element in the axial direction.

8. The sealing arrangement according to claim 1, wherein the at least one connection terminal element is arranged within a through opening formed in the holding element, wherein the holding element bears against an outside of the housing and the at least one connection terminal element protrudes through the through opening of the housing into a volume enclosed by the housing.

9. The sealing arrangement according to claim 1, wherein the holding element is formed plate-shaped with oppositely arranged surfaces and at least one through opening for receiving the at least one connection terminal element.

10. The sealing arrangement according to claim 8, wherein the holding element has a sealing surface running fully around the through opening of the holding element for bearing the at least one sealing element on a side oriented facing the housing.

11. The sealing arrangement according to claim 10, wherein the sealing surface of the holding element is formed on a free end face of a protrusion which protrudes from a surface of the side of the holding element oriented facing the housing in the axial direction.

12. The sealing arrangement according to claim 1, wherein a support element is arranged between the at least one connection terminal element and a wall of a carrier element, sealing the at least one connection terminal element against the carrier element.

13. The sealing arrangement according to claim 12, wherein the support element and the carrier element are firmly connected to one another.

14. The sealing arrangement according to claim 13, wherein the support element and the carrier element are formed as an integral component.

15. A method for mounting the sealing arrangement for guiding electrical connections through the wall of the housing according to claim 1, comprising steps of:

connecting the at least one connection terminal element with the at least one sealing element and a support element which fully and sealingly enclose the at least one connection terminal element at least in regions, connecting the at least one connection terminal element with the at least one sealing element and the support element which enclose the at least one connection terminal element to the holding element by introducing the at least one connection terminal element into a through opening formed in the holding element in a direction of a longitudinal axis, wherein the at least one sealing element bears against the holding element, introducing the at least one connection terminal element in the direction of the longitudinal axis into the through opening formed in the wall of the housing, wherein the at least one sealing element is arranged between the housing and the at least one connection terminal element, connecting a conductive wire as a connection line of a coil in a region of an end face of the at least one connection terminal element to the at least one connection terminal element, and attaching the holding element to the housing, wherein the holding element is pressed against the at least one sealing element arranged on the holding element in the direction of the longitudinal axis such that the at least one sealing element is elastically deformed and seals in the radial direction.

16. The method according to claim 15, wherein the at least one connection terminal element with the support element is introduced into a carrier element in the through opening formed in the wall of the housing in the direction of the longitudinal axis during operation of insertion, such that the support element is arranged between the at least one connection terminal element and a wall of the carrier element, sealing the at least one connection terminal element against the carrier element.

17. A method for mounting the sealing arrangement for guiding electrical connections through the wall of the housing according to claim 1, comprising steps of:

connecting the at least one connection terminal element with at least one sealing element and a support element which fully and sealingly enclose the at least one connection terminal element at least in regions and are formed as a component of a carrier element of a stator, connecting a conductive wire as a connection line of a coil in a region of an end face of the at least one connection terminal element to the at least one connection terminal element by putting the carrier element on the stator, introducing the at least one connection terminal element in a direction of a longitudinal axis into a through opening formed in the wall of the housing, wherein the at least one sealing element is arranged between the housing and the at least one connection terminal element, connecting the holding element to the at least one connection terminal element by introducing the at least one connection terminal element into a through opening formed in the holding element in the direction of the longitudinal axis, wherein the at least one sealing element bears against the holding element, and attaching the holding element to the housing, wherein the holding element is pressed against the at least one sealing element arranged on the holding element in the direction of the longitudinal axis such that the at least one sealing element is elastically deformed and seals in the radial direction.

18. The method according to claim 15, wherein the at least one connection element is introduced in the longitudinal direction into an opening formed in the at least one connection terminal element, such that the connection element and the at least one connection terminal element are aligned coaxially to one another and are electrically connected to one another.

19. A sealing arrangement for guiding electrical connections through a wall of a housing for a device for driving a compressor, comprising a connection arrangement with at least one electrically conductive connection element and a holding element, wherein at least one connection terminal element for receiving the at least one connection element is formed in an axial direction, which is respectively enclosed by the holding element and at least one sealing element, wherein the holding element for receiving the at least one connection terminal element is formed from an electrically non-conductive material, and the at least one sealing element is arranged in a region of a through opening of the housing between the housing and the at least one connection terminal element and respectively arranged sealing in a radial direction, in a fluid-tight manner on the housing and bearing against the at least one connection terminal element, wherein the at least one connection terminal element is formed substantially as a circular cylinder with sections with different outer diameters arranged along a longitudinal axis.

20. The sealing arrangement according to claim 19, wherein the at least one connection terminal element is arranged with a first section within a through opening formed in the holding element, wherein the first section of the at least one connection terminal element has an outer diameter which substantially corresponds to an inner diameter of the through opening.

21. The sealing arrangement according to claim 20, wherein the at least one connection terminal element has a second section joining the first section in a direction of the longitudinal axis and which is formed with a larger outer diameter than the first section.

22. The sealing arrangement according to claim 21, wherein the second section of the at least one connection terminal element is fully enclosed by the at least one sealing element at least in regions.

23. The sealing arrangement according to claim 22, wherein the second section of the at least one connection terminal element is formed with the outer diameter which corresponds to an inner diameter of the at least one sealing element plus a clearance.

24. The sealing arrangement according to claim 21, wherein the at least one connection terminal element has a third section joining the second section in the direction of the longitudinal axis and which is formed with a smaller outer diameter than the second section.

25. The sealing arrangement according to claim 24, wherein the third section and a region of the second section of the at least one connection terminal element which is arranged joining the third section are fully enclosed by a support element.

26. The sealing arrangement according to claim 25, wherein the support element is firmly connected to the at least one connection terminal element at least in a region of the third section of the at least one connection terminal element, wherein the third section of the at least one connection terminal element has the outer diameter which substantially corresponds to an inner diameter of the support element.

27. The sealing arrangement according to claim 26, wherein the support element is arranged with a first section in the region of the second section of the at least one connection terminal element and with a second section in the region of the third section of the at least one connection terminal element.

28. The sealing arrangement according to claim 24, wherein the at least one connection terminal element has a fourth section joining the third section in the direction of the longitudinal axis and which is formed with a smaller outer diameter than the third section.

29. A sealing arrangement for guiding electrical connections through a wall of a housing for a device for driving a compressor, comprising a connection arrangement with at least one electrically conductive connection element and a holding element, wherein at least one connection terminal element for receiving the at least one connection element is formed in an axial direction, which is respectively enclosed by the holding element and at least one sealing element, wherein the holding element for receiving the at least one connection terminal element is formed from an electrically non-conductive material, and the at least one sealing element is arranged in a region of a through opening of the housing between the housing and the at least one connection terminal element and respectively arranged sealing in a radial direction, in a fluid-tight manner on the housing and bearing against the at least one connection terminal element, wherein the at least one connection terminal element is formed with an opening shaped as a circular cylinder starting from an end face aligned facing in a direction of an outside of the housing and extending in a longitudinal direction of the at least one connection terminal element for receiving the at least one connection element.

30. A sealing arrangement for guiding electrical connections through a wall of a housing for a device for driving a compressor, comprising a connection arrangement with at least one electrically conductive connection element and a holding element, wherein at least one connection terminal element for receiving the at least one connection element is formed in an axial direction, which is respectively enclosed by the holding element and at least one sealing element, wherein the holding element for receiving the at least one connection terminal element is formed from an electrically non-conductive material, and the at least one sealing element is arranged in a region of a through opening of the housing between the housing and the at least one connection terminal element and respectively arranged sealing in a radial direction, in a fluid-tight manner on the housing and bearing against the at least one connection terminal element, wherein the at least one connection element is formed as a pin-shaped plug connector in a cylindrical manner.

31. The sealing arrangement according to claim 30, wherein the at least one connection element is formed as a circular cylinder with a constant outer diameter.

32. The sealing arrangement according to claim 30, wherein a first end of the at least one connection element is arranged inserted into an opening formed as a blind hole on an end face of the at least one connection terminal element facing the outside of the housing.

33. A device for driving a compressor of a vaporous fluid, in particular an electric motor, comprising a sealing arrangement for guiding electrical connections through a wall of a housing for a device for driving a compressor, the sealing arrangement comprising a connection arrangement with at least one electrically conductive connection element and a holding element, wherein at least one connection terminal element for receiving the at least one connection element is formed in an axial direction, which is respectively enclosed by the holding element and at least one sealing element, wherein the holding element for receiving the at least one connection terminal element is formed from an electrically non-conductive material, and the at least one sealing element is arranged in a region of a through opening of the housing between the housing and the at least one connection terminal element and respectively arranged sealing in a radial direction, in a fluid-tight manner on the housing and bearing against the at least one connection terminal element, the device having a rotor and a stator which are arranged extending along a common longitudinal axis, as well as the housing, wherein the sealing arrangement is formed at a first end face of the stator oriented in the axial direction.

34. A use of the device for driving the compressor, in particular the electric motor, for compressing the vaporous fluid according to claim 33 for a compressor of a refrigerant in a refrigerant circuit of an air-conditioning system of a motor vehicle.

* * * * *